Nov. 10, 1964 W. A. BEDFORD, JR 3,156,282
SHEET METAL FASTENER WITH T-SHAPED KEY
Filed Feb. 8, 1962
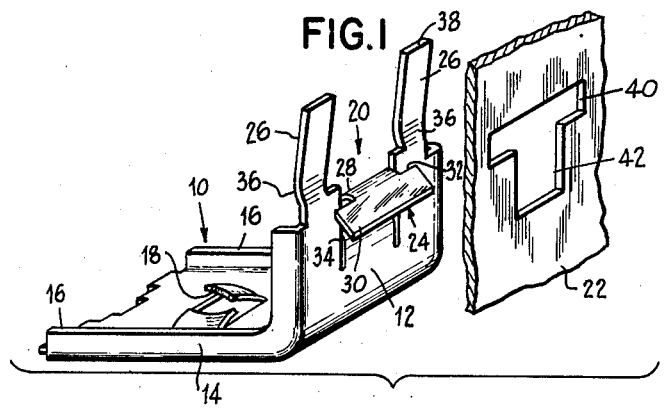
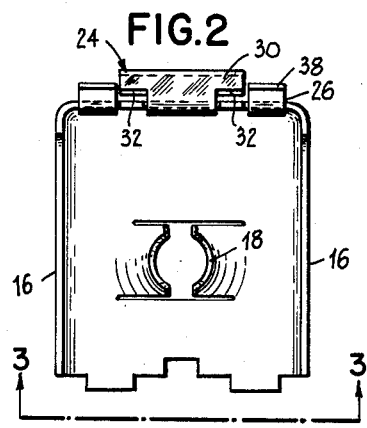
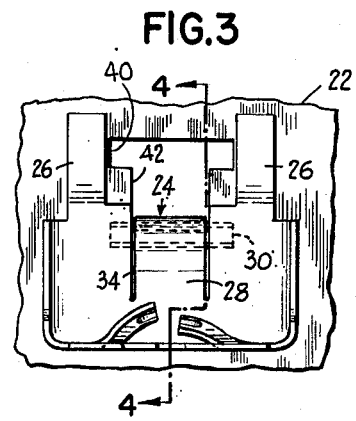
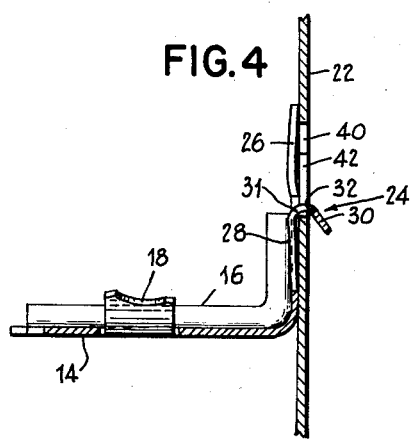
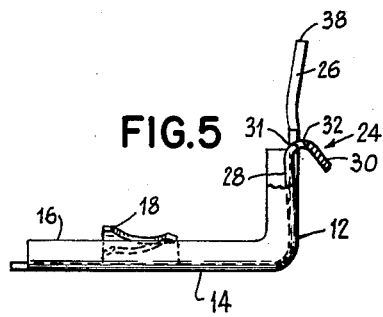
INVENTOR.
WILLIAM A. BEDFORD JR.
BY
ATTORNEY

United States Patent Office 3,156,282
Patented Nov. 10, 1964

3,156,282
SHEET METAL FASTENER WITH
T-SHAPED KEY
William A. Bedford, Jr., Littleton, Colo., assignor, by mesne assignments, to Thompson Bremer & Company, Chicago, Ill., a corporation of Delaware
Filed Feb. 8, 1962, Ser. No. 171,861
6 Claims. (Cl. 151—41.75)

The present invention relates to fasteners and particularly to a bracket for joining the sides of box-like structures perpendicular relationship.

In the manufacture of electronic equipment, it is customary to enclose the circuitry and components in variously sized box-like chassis, which must be capable of being easily dismantled in order to permit entry or replacement of parts. It has been found advantageous to form such structures out of a plurality of flat sheet metal sides or plates joined together by right angle fasteners with at least one leg of the fastener being in the form of a clip for easy attachment or disassembly.

A form of fastener suitable for the above purpose is shown in U.S. Patent 2,708,088, to C. J. Steinke dated May 10, 1955. This patent describes a right angle bracket having one leg or land portion provided with the T-shaped key extending outwardly at a substantially right angle for engagement within a mating T-shaped slot formed in a chassis member. The land portion of the bracket is further provided with a retaining surface substantially parallel to the key member for simultaneous engagement with a corresponding mating projection on the chassis. The Steinke device, while suitable, is not entirely satisfactory, in that; (1) the design requires the formation of precisely located mating slots and projections in one of the chassis plates to be joined together; (2) requires the same chassis plate to be formed with additional elements such as dimples, rises, etc. which engage the land portion of the bracket to force the bracket into a tight fit against the chassis member; (3) notwithstanding the mating surface, dimples, etc., the bracket in practice, is only loosely held in engagement tending to twist and come apart easily from the chassis member.

It is therefore an object of the present invention to provide an improved bracket for joining sheet metal plates in secure and rigid perpendicular relation.

It is a further objection to provide a bracket which, while easily assembled to a sheet metal plate is self-locking thereto in a secure and easily removable manner.

It is another object for the present invention to provide a bracket which requires only one mating slot in the chassis member and requires no projecting, retaining surfaces.

The preferred form of the invention will now be described with reference to the accompanying drawing in which:

FIG. 1 is a perspective view of the fastener shown in conjunction with a section of sheet panel;

FIG. 2 is a top plan view of the fastener shown in FIG. 1;

FIG. 3 is an end elevational view along the direction shown by line 3—3 of FIG. 2;

FIG. 4 is a sectional view taken along line 4—4 of FIG. 3, and;

FIG. 5 is a side elevational view, partially sectioned, of the fastener.

With reference to the drawings, the bracket 10 is formed of a single rectangular piece of sheet metal bent into a right angle shape having an upper leg or upright land 12 and a lower leg or base land 14. Inturned edges or flanges 16 are provided to give the fastener rigid characteristics preventing both bending and twisting. The lower leg 14 is provided with a thread-cutting self-locking aperture 18 for receiving a screw member for more or less permanent attachment to a sheet metal panel. Other means well known in the art may, of course, be substituted for the self-locking and threading aperture as desired.

The present invention resides in the formation of the novel clip structure designated generally as 20 which povides for the simple but secure attachment of the fastener to a sheet metal panel 22. The clip 20 formed on the upper leg 12 of the bracket comprises a T-shaped key member or head 24 and integrally formed portions in the form of a pair of fingers 26, all integral with and extending from the leg 12. The T-shaped head 24 and fingers 26 are stamped directly from the sheet metal material to lie in substantially perpendicular planes. The stem or leg 28 of T-shaped head 24 is bent outwardly of the fastener 10 so that the cross arms 30, forming a transversely disposed head on the key member, overlie a portion of leg 12 providing a lead 31 of limited space between the inner edges 32 of the T-head cross arms 30 and the flat face of the leg 12 for the accommodation of the sheet metal panel 22.

The stem 28 of the T-head is formed relatively large considering the entire length of the leg 12 of the bracket, by cutting slits 34 in the leg 12 during the stamping. Because of these rather elongated slits 34, the leg 28 may be bent doubly to provide a strong sure spring-gripping action between the cross arms 30 and the leg 12 so that a variety of panels may be accommodated by the single clip. Firstly, the stem 28 is so bent that the cross arms 30 lie in a plane swung more than 90° from the plane of the leg 12, and, secondly, the stem 28 is bent inwardly at its base, where it is integral with the leg. Both bends are shown clearly in FIG. 5 and in FIG. 4. The effect of both bends is to provide, first a lead 31 which is to be substantially less than that which would be provided by merely extending the T-head perpendicularly from leg 12; and secondly, a resilient stem and variable length head which permits adjustment for panels of different thicknesses. It is preferable that the lead 31 be made substantially less than the thinnest panel to which the clip is to be attached so that key head 24 positively grasps the panel between it and leg 12. This may be accomplished during manufacture, or later by, manually if desired, varying the bend in the leg 28.

It will be noted that because of the shape of the clip 20, an upright panel 22 must be pre-cut only with a T-shaped slot or mating opening, to provide for the insertion and attachment of the fastener. This presents no problem and requires even less fabrication of the panel than had been required with the use of the prior art.

The fingers 26 extend substantially coplanar with the remainder of the leg 12 except that they too are bent inwardly of the fastener at a point 36 where they are integral with the leg. This bend places the end 38 of the fingers 36 outwardly beyond the plane of the leg 12 so that it too is provided with a spring-gripping action when applied to the panel 22 and results in digging of the ends 38 of both legs into the surface of the panel.

In use, the fastener 10 is placed in proximity with the panel 22 and the T-head 24 is inserted through the wider portion 40 of the similarly shaped aperture. The fastener is then manually depressed into the narrower portion 42 so that the flat panel 22 will be grasped between the leg 12 and the inner edges of the cross arms 30 as shown in FIG. 5. The clip is then firmly placed and will not rotate or twist out of position because of the tightened spring action of stem 28 of the T-head and the incision of ends 38 of fingers 26 into the panel 22. As observed in FIG. 4, the stem 28 and the fingers 26 flex and substantially straighten out in accommodation with the panel.

Once clipped to panel 22, the fastener is rigidly in place and may be employed to fasten another panel (not shown) to the lower leg 14.

Among the advantages of the present invention are:

(1) The ability of the fastener to be simply and easily manufactured which may be employed on a variety of panel sizes;

(2) The ability of the fastener to be easily clipped rigidly into place;

(3) The spring action of both the T-head and the fingers which cause the metallic edges of the fastener to bite into the panel and form a substantially permanent seat thereon, no matter what size panel is employed;

(4) The ability to remove the fastener by merely overcoming the spring bias of the fingers and T-head.

It will thus be seen that the objects set forth above, and those made apparent from the preceding description, are efficiently attained. As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. A bracket for joining a pair of plates or the like in angularly disposed relationship, comprising a generally rigid angle member having an upright land and a base land extending in angularly intersecting planes from a junction thereof toward free ends of the lands and adapted to be respectively secured to correspondingly disposed panels at a junction thereof, the upright land having a T-shaped key member struck therefrom for anchoring in a mating T-shaped slot in an upright panel of any of a range of thicknesses, said key member including a leg projecting generally upwardly from an integral connection with the upright land adjacent said junction and a transversely disposed head on a free end of the leg, said leg being bent first slightly inwardly from the plane of said upright land and then sharply outwardly and downwardly through an angle substantially more than 90° to dispose the head outwardly beyond said upright land with a transverse edge of the head directed inwardly toward the upright land for engaging the outer side of said upright panel when it is clamped between the head and the upright land, the first inward bend of said leg providing a yieldable lead for inwardly biasing said edge of the head into tight, incision engagement with said upright panel, said upright land also having integrally formed portions projecting upwardly on opposite sides of and beyond said key member for engaging the inner side of said upright panel in opposition to inward biasing forces imposed on the head of said key member.

2. A bracket according to claim 1 in which said portions of said upright land are in the form of laterally spaced and upwardly directed fingers that are bent first slightly inwardly and then outwardly to dispose free ends thereof outwardly beyond the upright land for inward biasing by said upright panel when the latter is clamped between the head of said key member and the upright land.

3. A bracket according to claim 1 in which said portions of said upright land are in the form of laterally spaced and upwardly directed fingers that are bent first slightly inwardly and then outwardly to dispose free ends thereof outwardly beyond the upright land for inward biasing by said upright panel when the latter is clamped between the head of said key member and the upright land, the fingers having end edges directed outwardly for incision engagement with an inner surface of said upright panel.

4. A bracket according to claim 1 in which opposite sides of said lands are turned inwardly to provide side flanges thereon, each of which extends along one land, around the junction between the lands, and along the other land for stiffening the bracket.

5. A bracket according to claim 1 wherein said base land further includes thread-engaging means.

6. A self-retaining bracket adapted to be secured to a panel having any of a range of thicknesses wherein said panels may themselves be free of retaining surfaces and need have only one mating slot to effect such engagement, said bracket comprising a generally rigid angle member having an upright land and a base land extending in angularly intersecting planes from a junction thereof toward the free ends of the lands, said base land being adapted to serve as a support member, the upright land having a T-shaped key member for engaging a mating T-shaped slot in one of said panel, said key member including a metallic leg projecting generally upwardly from an integral connection with the upright land adjacent said junction and a transversely disposed head on the free end of the leg, said leg being bent first slightly inwardly from the plane of said upright land and then sharply outwardly and downwardly through an angle substantially more than 90° to dispose the head outwardly beyond said upright land with a transverse edge of the head directed inwardly toward the upright land to provide a gap between said transverse edge and upright land which is less than the minimal panel thickness of said range, said angular disposition of the leg member more than 90° providing a tight fit thereof with the slot of said panel as said gap is forcibly increased during said engagement, said upright land also having resilient metallic fingers projecting upwardly on opposite sides of and beyond said key member for engagement with an adjacent side of said panel, said fingers resiliently opposing the inward biasing forces imposed on the head of said key member.

References Cited by the Examiner
UNITED STATES PATENTS

| | | | |
|---|---|---|---|
| 1,586,680 | 6/26 | Kurowski | 151—41.75 |
| 1,628,249 | 5/27 | Kirfman | 287—64 |
| 2,616,142 | 11/52 | Tinnerman | 85—36 |
| 2,661,821 | 12/53 | Tinnerman | 151—41.75 |
| 2,708,088 | 5/55 | Steinke | 151—41.75 |
| 2,745,458 | 5/56 | Bedford | 151—41.75 |
| 2,982,324 | 5/61 | Zehran | 151—41.75 |
| 3,073,368 | 1/63 | Meyer | 151—41.75 |

EDWARD C. ALLEN, *Primary Examiner.*

WALTER A. SCHEEL, *Examiner.*